(12) United States Patent
Key et al.

(10) Patent No.: US 7,516,238 B2
(45) Date of Patent: Apr. 7, 2009

(54) BACKGROUND TRANSPORT SERVICE

(75) Inventors: Peter B. Key, Cambridge (GB); Laurent Massoulie, Cambridge (GB); Bing Wang, Amherst, MA (US)

(73) Assignee: Microsoft Corporation, Redmond, WA (US)

( * ) Notice: Subject to any disclaimer, the term of this patent is extended or adjusted under 35 U.S.C. 154(b) by 1110 days.

(21) Appl. No.: 10/676,772

(22) Filed: Sep. 30, 2003

(65) Prior Publication Data

US 2005/0071451 A1 Mar. 31, 2005

(51) Int. Cl.
*G06F 15/16* (2006.01)
(52) U.S. Cl. .................... 709/232; 709/224; 370/229
(58) Field of Classification Search ......... 709/230–237, 709/224; 370/229–235
See application file for complete search history.

(56) References Cited

U.S. PATENT DOCUMENTS

| | | | |
|---|---|---|---|
| 6,205,120 B1 * | 3/2001 | Packer et al. ................. | 370/235 |
| 6,292,834 B1 | 9/2001 | Ravi et al. | |
| 6,438,603 B1 | 8/2002 | Ogus | |
| 6,463,454 B1 | 10/2002 | Lumelsky et al. | |
| 6,466,980 B1 | 10/2002 | Lumelsky et al. | |
| 6,587,575 B1 | 7/2003 | Ogus | |
| 6,594,701 B1 | 7/2003 | Forin | |
| 6,597,660 B1 * | 7/2003 | Rueda et al. ............. | 370/230.1 |
| 2002/0080721 A1 * | 6/2002 | Tobagi et al. ............... | 709/233 |
| 2002/0112057 A1 * | 8/2002 | Srinivas et al. .............. | 709/226 |
| 2002/0122385 A1 * | 9/2002 | Banerjee ..................... | 370/229 |

OTHER PUBLICATIONS

Dong, Yingfei; Rakshe, Rohit; Zhang, Zhi-Li; "A Practical Technique to Support Controlled Quality Assurance in Video Streaming across the Internet", Proc. Packet Video Workshop, 2002; Minneapolis, MN; 12 pages.
Semke, Jeffrey; Mahdavi, Jamshid; Mathis, Matthew; "Automatic TCP Buffer Tuning"; Proc. ACM SIGCOMM, 1998; pp. 315-323.
Crowcroft, Jon; Oechslin, Philippe; "Differentiated End-to-End Internet Services Using a Weighted Proportional Fair Sharing TCP"; ACM Computer Communication Review, v 28, Jul. 1998; 15 pages.
Massoulie, L.; Roberts, J.; "Bandwidth Sharing: Objectives and Algorithms"; Proc. IEEE INFOCOM, v 3, 1999; pp. 1395-1403.
Zhang, Yin; Duffield, Nick; Paxson, Vern; Shenker, Scott; "On the Constancy of Internet Path Properties"; Proceedings of ACM SIGCOMM Internet Measurement Workshop, Nov. 2001; 15 pages.
Jain, Manish; Prasad, Ravi S.; Dovrolis, Constantinos; "The TCP Bandwidth-Delay Product Revisited: Network Buffering, Cross Traffic, and Socket Buffer Auto-sizing"; Tech. Rep. GIT-CERCS-03-02, College of Computing, Georgia Tech, 2002; pp. 1-15.

(Continued)

*Primary Examiner*—Saleh Najjar
*Assistant Examiner*—David Lazaro (57) ABSTRACT

In an application-level background transport service, a receiver node infers the available network capacity between itself and a sender node over a control interval. Based on the inferred available network capacity, the receiver node adjusts its receive window size accordingly in order to conservatively optimize the bandwidth used by a background transfer without degrading performance of other foreground transfers on the network. The adjusted receive window size is communicated to the sender node, which is likely to adjust its send window size based on the adjusted receive window size.

38 Claims, 5 Drawing Sheets

OTHER PUBLICATIONS

Spring, Neil T.; Chesire, Maureen; Berryman, Mark; Sahasranaman, Vivek; Anderson, Thomas; Bershad, Brian; "Receiver Based Management of Low Bandwidth Access Links" Proc. IEEE INFOCOM; v.1, 2000; pp. 245-254.

Mehra, Puneet; Zakhor, Avideh; De Vleeschouwer, Christophe; "Receiver-Driven Bandwidth Sharing for TCP" Proc. IEEE INFOCOM, 2003; 11 pages.

Ribeiro, Vinay; Coates, Mark; Riedi, Rudolf; Sarvotham, Shriram; "Multifractal Cross-Traffic Estimation" Proc. ITC Specialist Seminar of IP Traffic Measurement, Modeling and Mangement, Sep. 2000, Monterey, CA; 10 pages.

Martin, Jim; Nilsson, Arne; Rhee, Injong; "The incremental Deployability of TRR-Based Congestion Avoidance for Hith Speed TCP Internet Connections" IEEE/ACM Trans. Networking, Jun. 2003; 23 pages.

Rowstron, Antony; Druschel, Peter; "Storage Management and Caching in Past, a Large-Scale, Persistent Peer-to-Peer Storage Utility" Symposium on Operating Systems Principles, 2001; 13 pages.

Kuzmanovic, Aleksandar; Knightly, Edward W.; "TCP-LP: A Distributed Algorithm for Low Priority Data Transfer"; Proc. IEEE INFOCOM, 2003; 11 pages.

Venkataramani, Arun; Kokku, Ravi; Dahlin, Mike; "TCP Nice: A Mechanism for Background Transfers"; Proc. for Operating Systems Design and Implementation; Dec. 2002; 15 pages.

Venkataramani, Arun; Yalgandula, Praveen; Kokku, Ravindranath; Sharif, Sadia; Dahlin, Mike; "The Potential costs and Benefits of Long-term Prefetching for Content Distribution"; Computer Communication Journal, v 25, n 4 2002; pp. 367-375.

Ilvesmaki, Mika; Luoma, Marko; "On the Capabilities of Application Level Traffic Measurements to Differentiate and Classify Internet Traffic"; Internet Performance and Control of Network Systems II, Proceedings of SPIE vol. 4523 (2001); 11 pages.

Eggert, Lars; Heidemann, John; "Application-Level Diffentiated Services for Web Servers" World Wide Web Journal 1999; 12 pages.

Foley, Chris; "Dynamic Bandwidth Throttling" Jan. 2003 www.xcellenet.com/public/pdfs/products/afaria/literature/white_papers/Dynamic_Bandwidth_Throttling.pdf.

* cited by examiner

BACKGROUND TRANSPORT SERVICE

TECHNICAL FIELD

The invention relates generally to communications networks, and more particularly to a background transport service operating in a communications network.

BACKGROUND

In a communication networks, different communications can have different levels of priority. For example, network access for user operations (e.g., file access, email access, web services) typically have a higher level of priority than network access for background operations, such as downloading program updates, synchronizing application data, and backing up local files. Background operations commonly include services that require little or no user interaction during the background operations and are therefore less sensitive to communication delays. Delays in network communications for the user activities noticeably degrade the user's experience, as may be reflected in the frustration of a pronounced pause during an active operation (e.g., opening a new email message). In contrast, such delays are hardly noticeable, if at all, for background operations.

In one background application, program updates may be downloaded to the user's system in the "background", while the user works normally on other tasks in the "foreground". After the program updates are downloaded, the user may be notified of the presence of the program updates on his or her system and prompted for authorization to install the new updates.

While performance of the background operations are less important (i.e., at a lower priority) than the performance of the foreground operations, performance of the background operations is still a consideration. In many systems, background operations should not impact foreground operations. Therefore, when a foreground operation requires more bandwidth, background operations are expected to back off and reduce their bandwidth usage. Nevertheless, background operations may be expected to optimize their bandwidth usage to some extent in order to make best use of available resources. Therefore, background operations should be reactive to available bandwidth where possible.

Existing approaches for managing background communications, however, typically require special intelligence throughout the network to provide information useful in managing the bandwidth usage of background operations. However, such intelligence is frequently not available in many networks and, therefore, cannot be assumed. Alternatively, some approaches require changes to the network communications stack throughout the network (e.g., changes to the transport protocol, such as TCP); however, such changes to a transport protocol may be difficult to deploy.

In addition, some existing approaches consider the communications capabilities of the user's system (e.g., the ability of the user's system to handle additional background traffic) while taking no account of the impact such background operations on foreground operations of other nodes on the network or of bandwidth constraints of the network itself. Therefore, these approaches may undesirably impact the performance of foreground operations on other network nodes by increasing the bandwidth usage of the background operations too high.

SUMMARY

Implementations described and claimed herein address the foregoing problems by providing an application-level background transport service that does not require special intelligence throughout the network and that considers the impact of increased background bandwidth usage on the network between the sending and receiving nodes. The available network capacity is inferred by a receiver node, which adjusts its receive window accordingly in order to conservatively optimize the bandwidth used by a background transfer without degrading performance of other foreground transfers on the network.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

The computer program product encodes a computer program for executing a computer process on a computer system. Network capacity that is available for communications between a first node and a second node is evaluated based on transfer data received by the second node from the first node within a specified receive window during a specified control interval. An adjusted receive window size is generated for a subsequent control interval based on evaluated availability of the network capacity in the specified control interval.

In another implementation, a method is provided. Network capacity that is available for communications between a first node and a second node is evaluated based on transfer data received by the second node from the first node within a specified receive window during a specified control interval. An adjusted receive window size is generated for a subsequent control interval based on evaluated availability of the network capacity in the specified control interval.

In yet another implementation, a system is provided. An estimating module evaluates network capacity available for communications between a first node and a second node based on transfer data received by the second node from the first node within a specified receive window during a specified control interval. An adjusting module generating an adjusted receive window size for a subsequent control interval based on evaluated availability of the network capacity in the specified control interval.

Other implementations are also described and recited herein.

DETAILED DESCRIPTION

In an application-level background transport service, a receiver node infers the available network capacity between itself and a sender node over a control interval. Based on the inferred available network capacity, the receiver node adjusts its receive window size accordingly in order to conservatively optimize the bandwidth used by a background transfer without degrading performance of other foreground transfers on the network. The adjusted receive window size is communicated to the sender node, which is likely to adjust its send window size based on the adjusted receive window size. One implementation for adjusting the receive window size involves adjusting the configured receive buffer size in the receiver node, which is likely to result in a change to the receive window size and ultimately, the send window size at the sender node.

Figure 1:
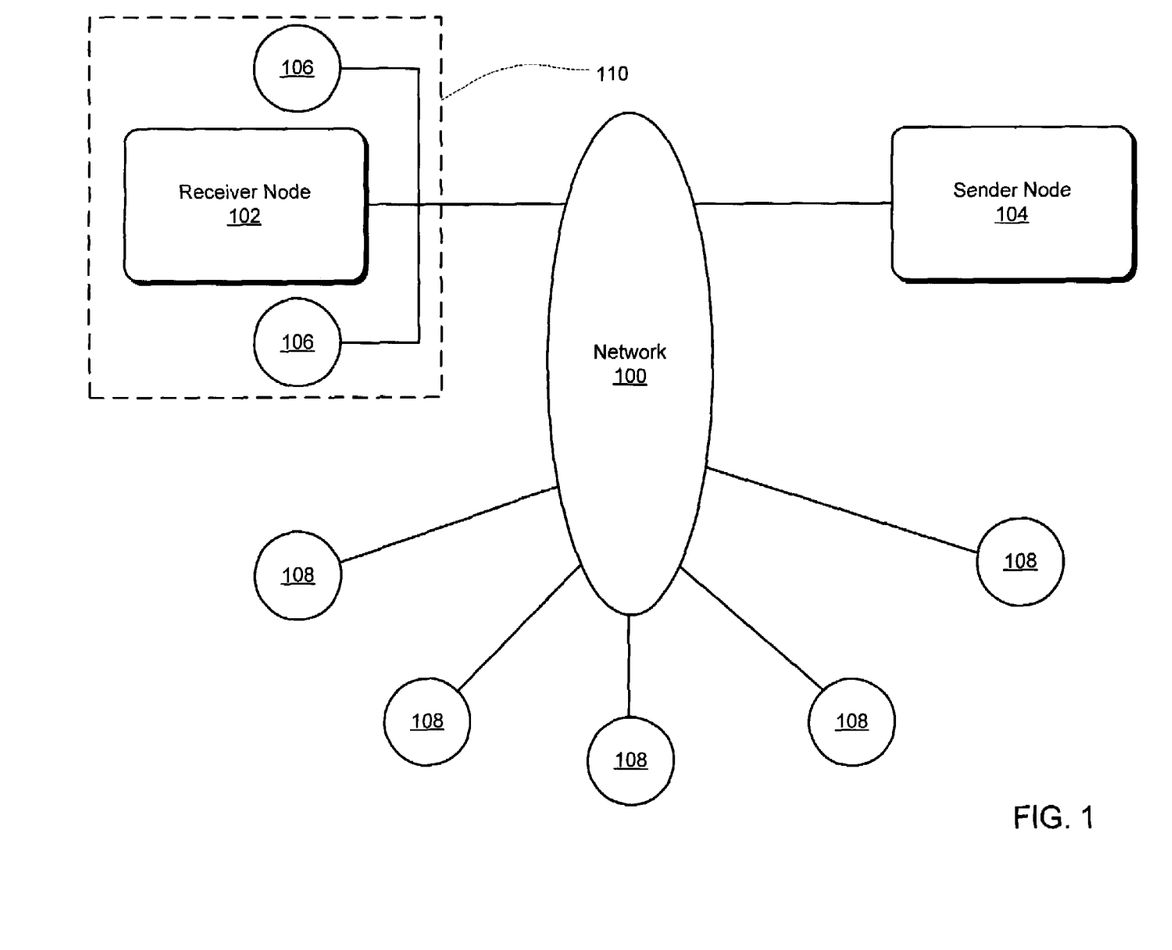
FIG. 1 illustrates a communications network with an exemplary background transport service.

FIG. 1 illustrates a communications network with an exemplary background transport service. A network 100 couples multiple network nodes, including a receiver node 102, a sender node 104, subnet nodes 106, and other nodes 108, to allow communications among the nodes. The network 100 is generally characterized by a maximum network capacity, which in one implementation represents the maximum amount of data per second that can be communicated over the network. Within the network 100, there also exists an amount of the maximum network capacity that is currently used by various communication processes on the network (i.e., "used network capacity"). The amount of remaining available capacity in the network, (i.e., maximum network capacity minus used network capacity) is termed "available network capacity". The amount of available network capacity can change dynamically during any communication as packets enter and exit the network from/to various nodes.

In some applications, varying levels of data transfer priority may be used. For example, a background transfer is considered to have a lower priority than a foreground transfer and, therefore, may not be transferred at the same rate or reliability as a foreground transfer. Nevertheless, background transfers may be important to the system performance over the long run. Exemplary background transfers may include without limitations, large file backups, transferring updates to currently installed programs, contents pre-fetching, Internet contents distribution, storage management and caching in peer-to-peer systems, etc.

Generally, with many background transfers, the transfer should not interfere with (e.g., degrade the performance of) foreground transfers. On the other hand, many background transfers should substantially utilize available network capacity left by the foreground transfers so that the background transfer is completed as soon as possible.

In FIG. 1, the receiver node 102 and the subnet nodes 106 are included in a home sub-network 110, which is coupled to the network 100. In one scenario, the subnet nodes 106 may be streaming data between each other or from other nodes in the network (as a foreground transfers) when a background transfer (e.g., a program update) is initiated by the receiver node 102 with the sender node 104 through the network 100. In one implementation, the rate of the background transfer is controlled by adjusting the receiver-advertised window size (i.e., the receive window size) according to the dynamic available network capacity inferred between the receiver node 102 and the sender node 104.

In one implementation, the window represents the number of bytes of packets and acknowledgement packets that may be in transit between the sender node and the receiver node concurrently. In other implementations, a window may be defined in terms of packets or other communications characteristics.

In one implementation, the receive window size may be adjusted by adjusting the receive buffer size at the receiver node at the application level of the receiver node (e.g., at the socket layer). However, in other implementations, the receive window size may be adjusted directly (e.g., through the transport level) or though other indirect means. By at least these various means, the receive windows size may be adjusted and communicated to the sender node, which may adjust its send window size in accordance with the adjusted received window size.

Figure 2:
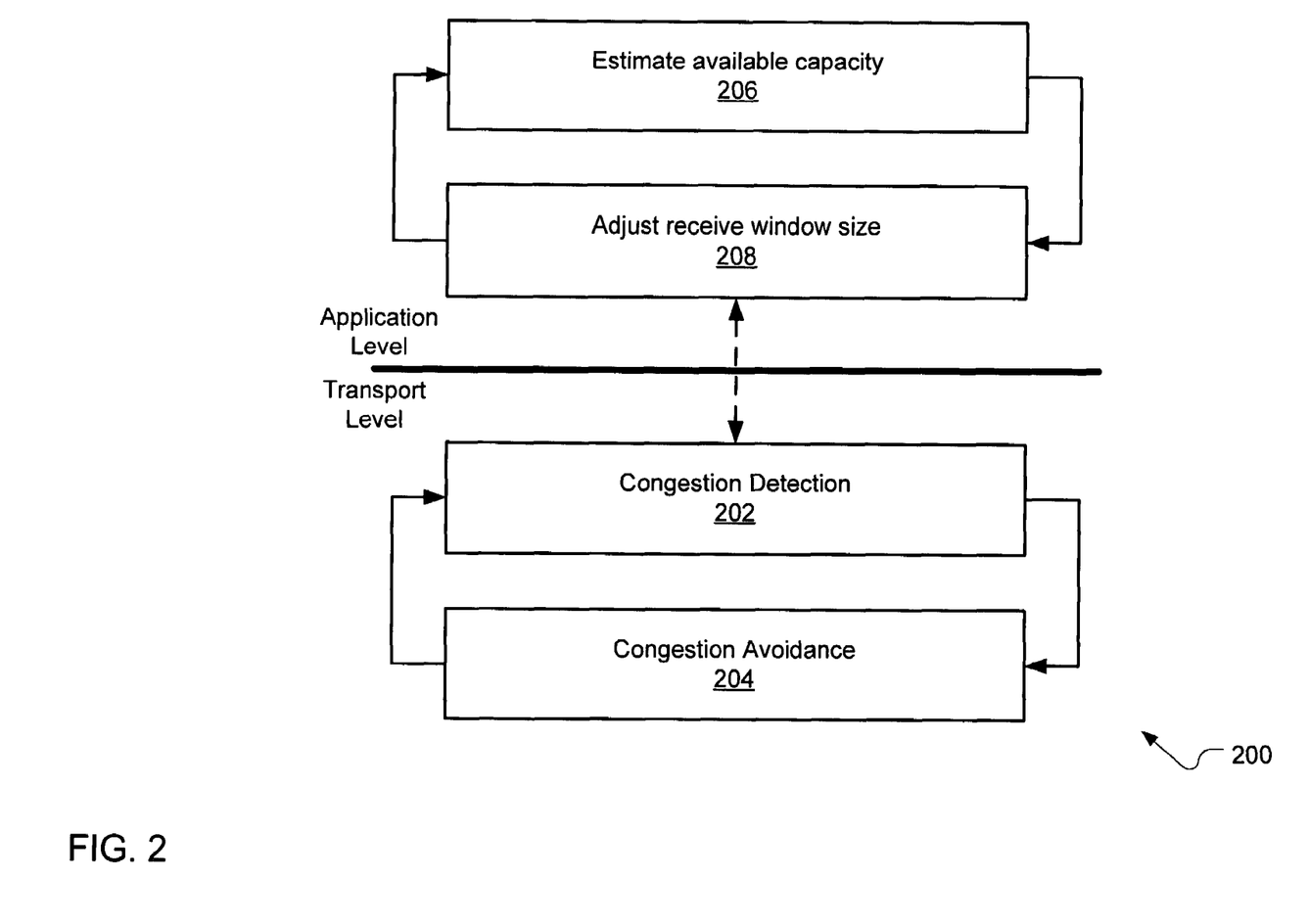
FIG. 2 illustrates an exemplary background transport service operating at an application level in combination with transport level operations.

FIG. 2 illustrates an exemplary background transport service 200 operating at an application level in combination with transport level operations. The application level operations and the transport level operations interact to process transmissions and receptions of data packets.

A transport level of the communications stack, such as represented by TCP and other transport level protocols, typically includes a reactive feature that includes network congestion detection and network congestion avoidance. In TCP, for example, packet losses may be detected in a congestion detection operation 202 and the offending packets are resent, with a congestion avoidance operation 204 reducing the congestion window of the sender, thereby reducing the sending rate.

At the application level, a receive window size may also be specified to the sending node to indicate the application's capacity to receive data. Both the congestion window size and the receive window size may influence the size of the sending node's send window, in that the sending node's send window size may be computed to be the minimum of the receive window size and the congestion window size. Typically, in many previous approaches, the receive window size does not change over the course of a data transfer.

In FIG. 2, however, an adjusting operation 206 evaluates the network capacity that is available between the receiver node and the sender node during a control interval. For example, in one implementation, the number of transferred data bytes received by the receiver node is measured. Based on this evaluation, the receiver node adjusts the size of the receive window that it specifies to the sender node in an adjustment operation 208. Responsive to the new receive window size, the sender node re-computes its send window size based on the minimum of the new receive window size and the congestion window size and continues transmitting in accordance with the new send window size. In one implementation, the adjusting operation 206 is performed by an adjusting module executing at the application level and the estimating operation 208 is performed by an estimating module executing at the application level.

Figure 3:
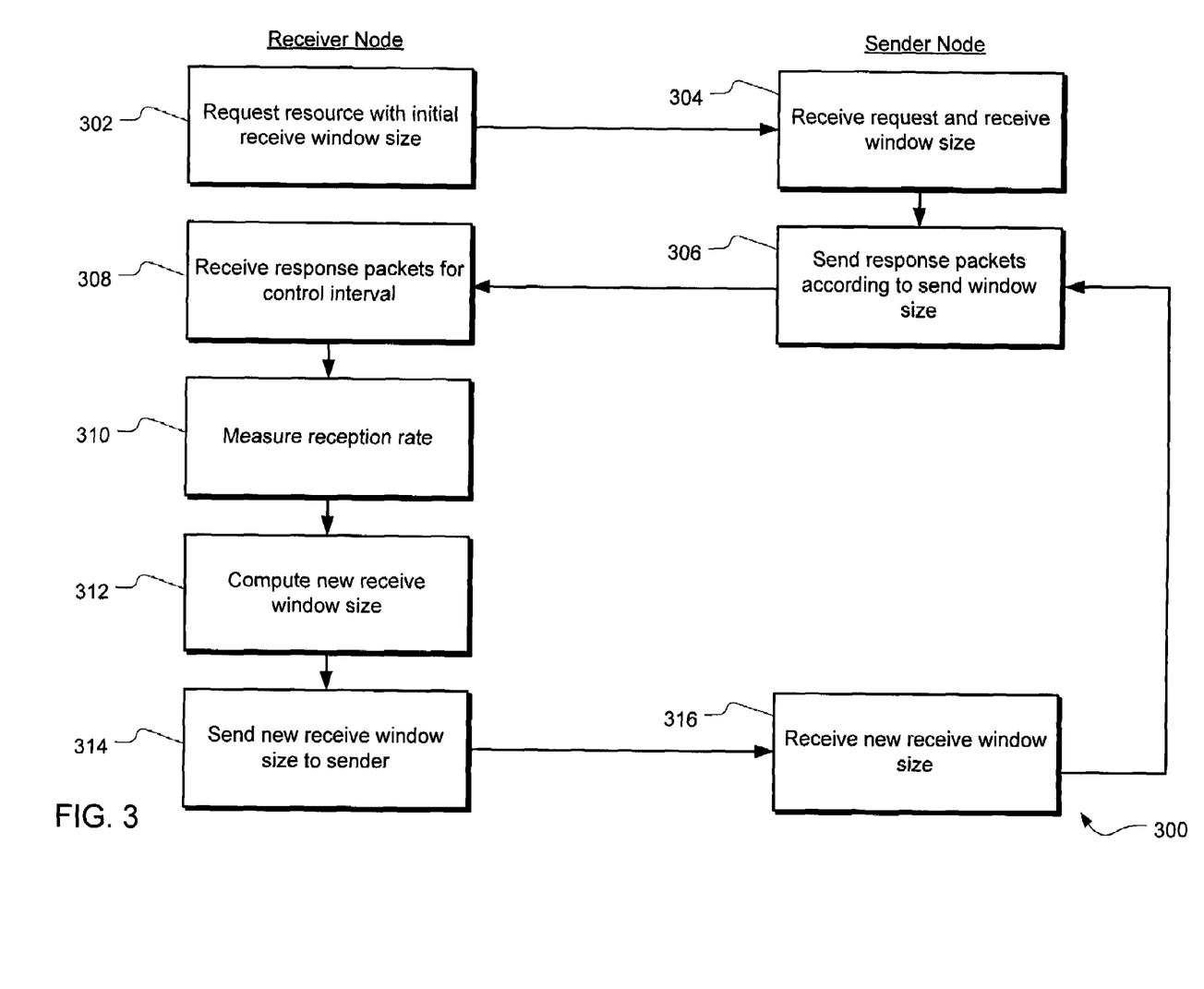
FIG. 3 illustrates operations of an exemplary background transport service.

FIG. 3 illustrates operations 300 of an exemplary background transport service. In one implementation, a receiver node requests a resource (e.g., a program update package) from a sender node and specifies to the sender node an initial receive window size in a request operation 302. It should be understood that in other implementations, the communications may be initiated by the sender node or some other node, which may also specify an initial receive window size.

A receiving operation 304 at the sender node receives the request and the initial receive window size. In a sending operation 306, the sending node computes a send window size based on the receive window size and sends response packets back to the receiver node in accordance with the send window size.

A receiving operation 308 at the receiver node receives the response packets for a specified control interval $T_n$ in a sequence of control intervals. A measurement operation 310 determines $R_n$, the number of bytes received at the receiver node during the $n^{th}$ control interval $T_n$. The measured $R_n$ is considered relative to the receive window size $W_n$ in the $n^{th}$ control interval to evaluate the available network capacity (e.g., to detect loss of expected transfer data at the receiver node). Network congestion tend to be indicated if the sensitivity of observed rate $R_n$ to window $W_n$ is smaller than it would be at smaller values of window size W, thereby suggesting that the receiver node should indicate to the sender node to back off the transmission rate of the transfer data.

A computation operation 312 computes a new receive window size. Two exemplary implementations of computing the adjusted receive window size are discussed with regard to FIG. 4.

A sending operation 314 communicates the adjusted receive window size to the sender node. In one implementation, the sending operation 314 is performed by a communications module in the receiver node, such as a networking library, a network adapter, or other communications software or hardware. A receiving operation 316 receives the adjusted receive window size from the receiver node and then processing returns to sending operation 306, which sends the response packets using a new send window size based on the adjusted receive window size.

Figure 4:
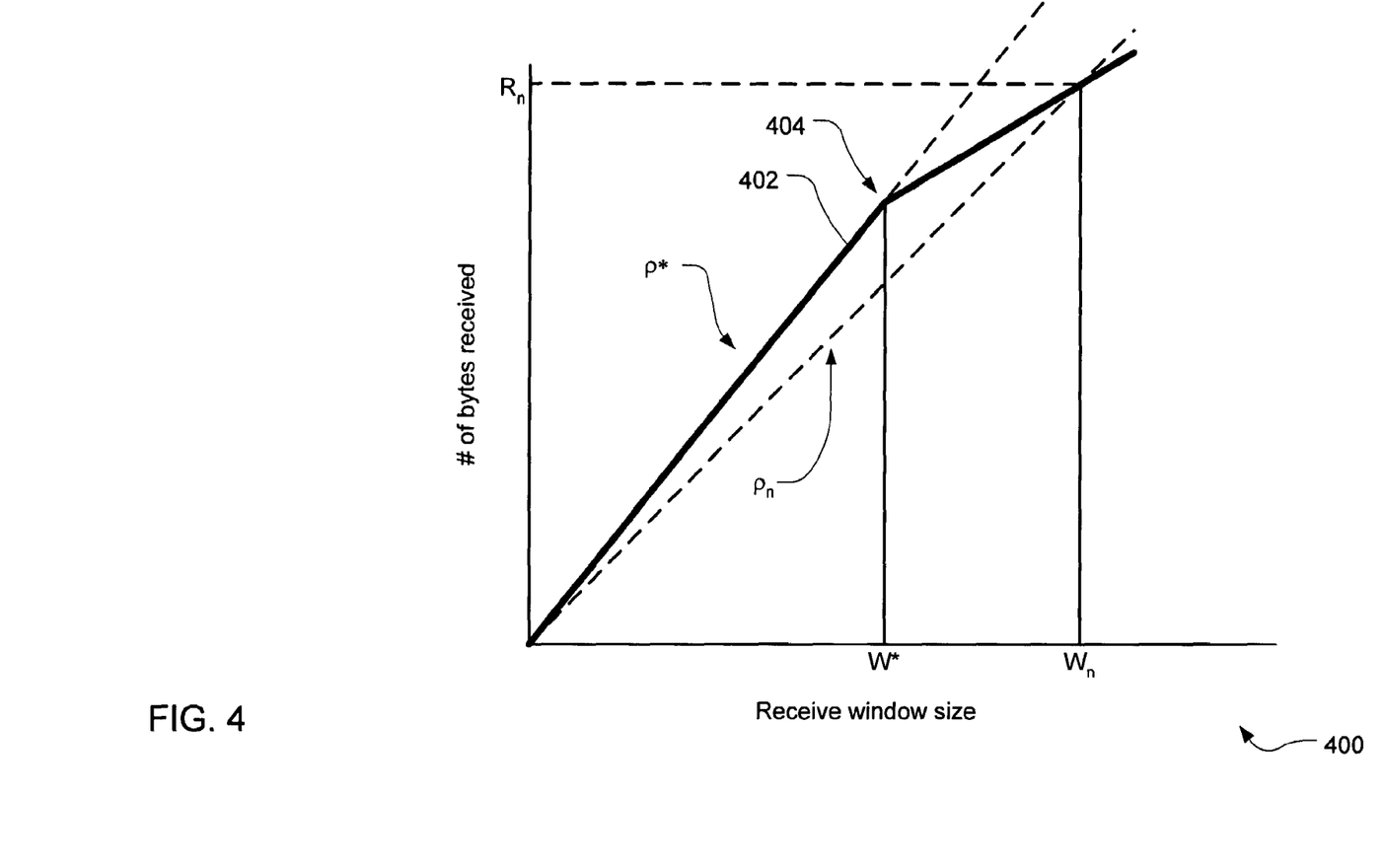
FIG. 4 illustrates considerations of an exemplary window adjustment algorithm.

FIG. 4 illustrates considerations of an exemplary window adjustment algorithm. Generally, the exemplary algorithm may be described with regard to the example graph 400 having a vertical axis representing the number of bytes $R_n$ received during the control interval $T_n$ and a horizontal axis representing the receive window size. However, alternative algorithms may be employed without regard to the example graph 400

The bold line 402 represents a slope associated with the number of bytes received during the control interval versus the receive window size. At a certain receive window size, the slope changes at point 404 because larger receive window sizes begin to contribute to congestion on the network. The point 404 corresponds to the substantially optimal receive window size because it provides the largest receive window size that does not degrade performance of foreground transfers. One implementation of the algorithm (e.g., when threshold $\epsilon=0$) leads to a determination of the "optimal" window size W*, measured in bytes. In other implementations, a non-zero threshold $\epsilon$ is used to accommodate measurement noise. The threshold is chosen sufficiently small to ensure that the adjusted receive windows size remains conservative (i.e., has a minimal impact on the network capacity used by foreground transfers).

The algorithm determines whether to increase or decrease the receive window size for a next control interval $T_{n+1}$. The slope $\rho$ in the current control interval n is computed as $$\rho_n = \frac{R_n}{W_n}$$

where $W_n$ is the size of the advertised receive window in bytes for control interval n. The most up-to-date estimate of the constant slope $\bar{\rho}$ (i.e., the last estimate of slope in the lower (non-reactive) portion of the graph, prior to the knee of the slope) is defined as $$\bar{\rho}=(1-\delta)\bar{\rho}+\delta\rho_n\, \mathit{iff}\, \rho_n-\bar{\rho} \geq -\epsilon$$

where $\delta>0$ is a weighting factor in the range [0,1] (e.g., $\delta=0.1$). The initial value of $\bar{\rho}$ may be set to $\rho_1$ (the slope as calculated in the first control interval). The initial value of $\bar{\rho}$ may also be obtained from stored historical data, from T/$\tau$ (where control interval T is measured in seconds and $\tau$ represents a historical estimate of the round-trip-time from sender to receiver), or using other means.

The value of $\epsilon$ influences the impact that the background flow may have on foreground flows. Given that the foreground flows transmit data with a round trip time of $\tau$ seconds (e.g., 10 milliseconds), and that the control interval duration is of T seconds (e.g., 500 milliseconds), then for a given value of $\epsilon$, the relative reduction in foreground flow throughput will be of the order $\epsilon\tau/T$. For example, if a maximum reduction in foreground traffic of 10% is targeted, then $\epsilon$ may be set to $T/(10\tau)$.

Given the estimate of $\bar{\rho}$, then the decision to determine whether to increase or decrease the receive window size may be made. If $\rho_n-\bar{\rho}\geq-\epsilon$, then $W_n\leq W^*$ and $W_{n+1}\geq W_n$ (the receive window size should increase). Otherwise, $W_n>W^*$ and $W_{n+1}<W_n$ and the receive window size should decrease).

The algorithm also determines how much to adjust the receive window size. A first implementation employs a binary search approach wherein the dynamic available network capacity is defined as being piece-wise stationary. Given a range of valid receive window sizes (i.e., assume $W^* \in [W_{min}, W_{max}]$) W* is found using a binary search (as exemplified in the pseudocode below):

```
do
    If (ρ_n - ρ̄ ≥ -ε, then W_min = W_n;
    If (ρ_n - ρ̄ < -ε, then W_max = W_n;
    W_{n+1} = (W_min + W_max)/2;
while W_max-W_min >1
```

Alternative implementations of binary searches or other searches may also be employed.

In an alternative implementation, stochastic approximation may be employed to determine the adjusted receive window size. Using an iteration rule:

$$W_{n+1}=W_n+\gamma(\epsilon+\rho_n-\bar{\rho})$$

where $$\gamma>0, (\rho_n-\bar{\rho})\geq-\epsilon \text{ implies } W_{n+1}\geq W_n, \text{ and } (\rho_n-\bar{\rho})<-\epsilon$$
$$\text{implies } W_{n+1}<W_n.$$

In this manner, $W_n$ converges in a stationary system. Hence, $\gamma$ is a positive gain parameter (e.g., $\gamma=1$). In this manner, $W_n$ converges to a limiting value in the stationary system. The larger $\gamma$, the faster the convergence but with a cost of larger oscillations. If one implementation, $\gamma_n$ can be an adaptive gain parameter, and if $\{\gamma_n\}$ is a sequence of positive numbers that converge slowly to zero, then $W_n$ converges to a stationary system.

Figure 5:
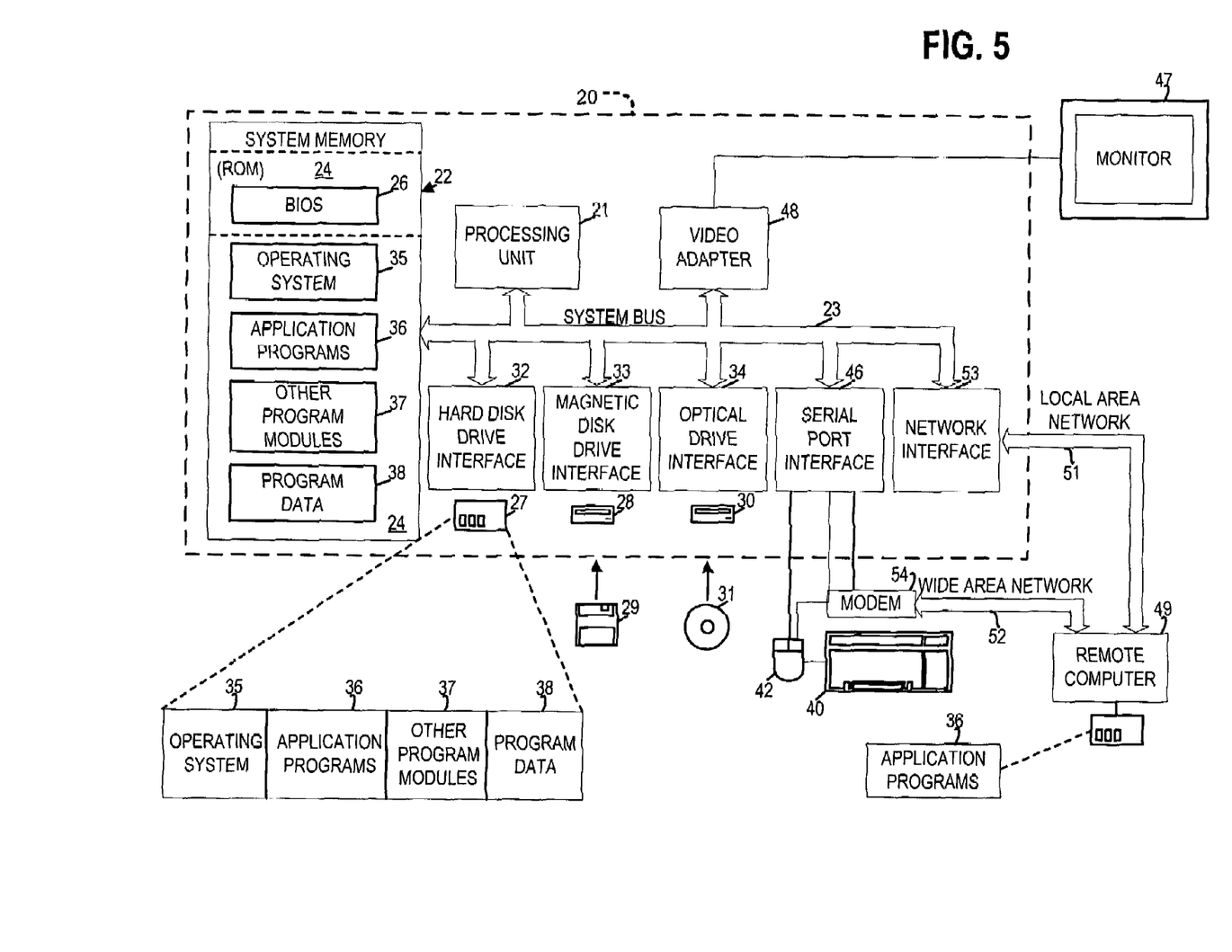
FIG. 5 illustrates a system useful for implementing an embodiment of the present invention.

The exemplary hardware and operating environment of FIG. 5 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 5. The logical connections depicted in FIG. 5 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, an estimation module, an adjustment module, and other modules may be incorporated as part of the operating system 35, application programs 36, or other program modules 37. Various windows sizes, control intervals, transfer data, requests, and other data may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method comprising:

evaluating network capacity available for communications between a first node and a second node based on transfer data received by the second node from the first node within a specified receive window during a specified control interval; and generating an adjusted receive window size for a subsequent control interval based on evaluated availability of the network capacity in the specified control interval, by adjusting a receive buffer size at the second node at an application level to generate the adjusted window size in the subsequent control interval, wherein the operation of generating further comprises evaluating a measured amount of the transfer data received by the second node during the specified control interval relative to the specified received window size to determine a slope for the specified control interval; and comparing the slope for the specified control interval against an estimate of a constant slope associated with additional available network capacity in at least one previous control interval and adjusting the receive window size for the subsequent control interval based on a result of the comparing.

2. The method of claim 1 further comprising: communicating the adjusted receive window size to the first node to instruct the first node to transmit to the second node in accordance with the adjusted receive window size in the subsequent control interval.

3. The method of claim 1 wherein the operation of generating comprises: applying the adjusted receive window size to a transport level of the second node in the subsequent control interval.

4. The method of claim 1 further comprising: communicating the adjusted receive window size to the first node to instruct the first node to adjust a send window size in accordance with the receive window and to transmit to the second node in accordance with the adjusted receive window size in the subsequent control interval.

5. The method of claim 1 wherein the operation of evaluating comprises: detecting a loss of the transfer data received by the second node during the specified control interval, relative to the specified receive window.

6. The method of claim 1 wherein the operation of evaluating comprises: measuring an amount of the transfer data received by the second node during the specified control interval.

7. The method of claim 1 wherein the operation of generating comprises: determining whether to increase or decrease the receive window to obtain the adjusted receive window size; and determining an amount by which to adjust the receive window to obtain the adjusted receive window size.

8. The method of claim 1 wherein the operation of generating comprises: determining an amount by which to adjust the receive window using a binary search to obtain the adjusted receive window size.

9. The method of claim 1 wherein the operation of generating comprises: determining an amount by which to adjust the receive window using a stochastic approximation to obtain the adjusted receive window size.

10. The method of claim 1 wherein
the comparing of the slope for the specified control interval against an estimate of a constant slope associated with additional available network capacity in the at least one previous control interval is performed in the presence of a measurement noise threshold.

11. The method of claim 1 wherein
the estimate of the constant slope represents a weighted average of at least one previous slopes associated with at least one previous control interval in which the previous slope exceeds or equals a previous estimate of the constant slope.

12. The method of claim 1 wherein the operations of evaluating and generating are performed at the application level.

13. A computer program product including a computer readable medium having encoded thereon a computer program for executing on a computer system a computer process, the computer process comprising:

evaluating network capacity available for communications between a first node and a second node based on transfer data received by the second node from the first node within a specified receive window during a specified control interval; and generating an adjusted receive window size for a subsequent control interval based on evaluated availability of the network capacity in the specified control interval, wherein the operation of generating further comprises evaluating a measured amount of the transfer data received by the second node during the specified control interval relative to the specified received window size to determine a slope for the specified control interval, and comparing the slope for the specified control interval against an estimate of a constant slope associated with additional available network capacity in at least one previous control interval and adjusting the receive window size based on a result of the comparing.

14. The computer program product of claim 13 wherein the computer process further comprises: communicating the adjusted receive window size to the first node to instruct the first node to transmit to the second node in accordance with the adjusted receive window size in the subsequent control interval.

15. The computer program product of claim 13 wherein the operation of generating comprises: adjusting a receive buffer size at the second node at an application level to generate the adjusted receive window size in the subsequent control interval.

16. The computer program product of claim 13 wherein the operation of generating comprises:

applying the adjusted receive window size to a transport level of the receive node in the subsequent control interval.

17. The computer program product of claim 13 the computer process further comprises:

communicating the adjusted receive window size to the first node to instruct the first node to adjust a send window size in accordance with the receive window and to transmit to the second node in accordance with the adjusted receive window size in the subsequent control interval.

18. The computer program product of claim 13 wherein the operation of evaluating comprises:

detecting a loss of the transfer data received by the second node during the specified control interval, relative to the specified receive window.

19. The computer program product of claim 13 wherein the operation of evaluating comprises:

measuring an amount of the transfer data received by the second node during the specified control interval.

20. The computer program product of claim 13 wherein the operation of generating comprises:

determining whether to increase or decrease the receive window to obtain the adjusted receive window size; and determining an amount by which to adjust the receive window to obtain the adjusted receive window size.

21. The computer program product of claim 13 wherein the operation of generating comprises:

determining an amount by which to adjust the receive window using a binary search to obtain the adjusted receive window size.

22. The computer program product of claim 13 wherein the operation of generating comprises:

determining an amount by which to adjust the receive window using a stochastic approximation to obtain the adjusted receive window size.

23. The computer program product of claim 13 wherein
the comparing of the slope for the specified control interval against an estimate of a constant slope associated with additional available network capacity in at least one previous control interval is performed in the presence of a measurement noise threshold.

24. The computer program product of claim 13 wherein
wherein the estimate of the constant slope represents a weighted average of at least one previous slopes associated with at least one previous control interval in which the previous slope exceeds or equals a previous estimate of the constant slope.

25. The computer program product of claim 13 wherein the operations of evaluating and generating are performed at the application level.

26. A system comprising:
an estimating module evaluating network capacity available for communications between a first node and a second node based on transfer data received by the second node from the first node within a specified receive window during a specified control interval; and
an adjusting module generating an adjusted receive window size for a subsequent control interval based on evaluated availability of the network capacity in the specified control interval,
wherein the adjusting module generates the adjusted receive window size by evaluating a measured amount of the transfer data received by the second node during the specified control interval relative to the specified received window size to determine a slope for the specified control interval; and
comparing the slope for the specified control interval against an estimate of a constant slope associated with additional available network capacity in at least one previous control interval and adjusting the receive window size for the subsequent control interval based on a result of the comparing.

27. The system of claim 26 further comprising:
a communication module communicating the adjusted receive window size to the first node to instruct the first node to transmit to the second node in accordance with the adjusted receive window size in the subsequent control interval.

28. The system of claim 26 wherein the adjusting module adjusts a receive buffer size at the second node at an application level to generate the adjusted receive window size in the subsequent control interval.

29. The system of claim 26 wherein the adjusting module applies the adjusted receive window size to a transport level of the second node in the subsequent control interval.

30. The system of claim 26 further comprising:
a communications module communicates the adjusted receive window size to the first node to instruct the first node to adjust a send window size in accordance with the receive window and transmits to the second node in accordance with the adjusted receive window size in the subsequent control interval.

31. The system of claim 26 wherein the estimating module detects a loss of the transfer data received by the second node during the specified control interval, relative to the specified receive window.

32. The system of claim 26 wherein the estimating module measures an amount of the transfer data received by the second node during the specified control interval.

33. The system of claim 26 wherein the adjusting module determines whether to increase or decrease the receive window to obtain the adjusted receive window size and determines an amount by which to adjust the receive window to obtain the adjusted receive window size.

34. The system of claim 26 wherein adjusting module determines an amount by which to adjust the receive window using a binary search to obtain the adjusted receive window size.

35. The system of claim 26 wherein the adjusting module determines an amount by which to adjust the receive window using a stochastic approximation to obtain the adjusted receive window size.

36. The system of claim 26 wherein the adjusting module compares the slope for the specified control interval against an estimate of a constant slope associated with additional available network capacity in at least one previous control interval in the presence of a measurement noise threshold.

37. The system of claim 26 wherein the estimate of the constant slope represents a weighted average of at least one previous slopes associated with at least one previous control interval in which the previous slope exceeds or equals a previous estimate of the constant slope.

38. The system of claim 26 wherein the estimating module and the adjusting module operate at the application level.

* * * * *